US008055776B1

(12) United States Patent
Dutta

(10) Patent No.: US 8,055,776 B1
(45) Date of Patent: Nov. 8, 2011

(54) SENDING FULL-CONTENT DATA TO A SECOND DATA PROCESSING SYSTEM WHILE VIEWING REDUCED-CONTENT DATA ON A FIRST DATA PROCESSING SYSTEM

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 09/543,310

(22) Filed: Apr. 5, 2000

(51) Int. Cl.
*G06F 15/16* (2006.01)

(52) U.S. Cl. .................................... 709/227; 709/217

(58) Field of Classification Search .................. 709/203, 709/225, 218, 217, 246, 206, 227, 230; 370/351
See application file for complete search history.

(56) References Cited

U.S. PATENT DOCUMENTS

| | | | |
|---|---|---|---|
| 5,257,369 A | 10/1993 | Skeen et al. | |
| 5,774,660 A | 6/1998 | Brendel et al. | |
| 5,774,668 A | 6/1998 | Choquier et al. | |
| 5,793,972 A | 8/1998 | Shane | |
| 5,860,074 A | 1/1999 | Rowe et al. | |
| 5,878,224 A | 3/1999 | Smith | |
| 5,953,392 A | 9/1999 | Rhie et al. | |
| 5,987,504 A | 11/1999 | Toga | |
| 6,055,564 A | 4/2000 | Phaal | |
| 6,094,671 A * | 7/2000 | Chase et al. | 709/201 |
| 6,098,180 A | 8/2000 | Kobata et al. | |
| 6,134,584 A | 10/2000 | Chang et al. | |
| 6,148,330 A * | 11/2000 | Puri et al. | 709/217 |
| 6,154,769 A | 11/2000 | Cherkasova et al. | |
| 6,243,761 B1 | 6/2001 | Mogul et al. | |
| 6,356,529 B1 * | 3/2002 | Zarom | 370/231 |
| 6,381,709 B1 | 4/2002 | Casagrande et al. | |
| 6,430,624 B1 * | 8/2002 | Jamtgaard et al. | 709/246 |
| 6,438,592 B1 | 8/2002 | Killian | |
| 6,449,637 B1 | 9/2002 | Toga | |
| 6,615,131 B1 * | 9/2003 | Rennard et al. | 701/200 |
| 6,707,809 B1 * | 3/2004 | Warrier et al. | 370/351 |

(Continued)

FOREIGN PATENT DOCUMENTS

EP 0 967 559 A1 12/1999

(Continued)

OTHER PUBLICATIONS

U.S. Appl. No. 09/292,191, filed Apr. 15, 1999.

(Continued)

*Primary Examiner* — Tonia L.M. Dollinger
*Assistant Examiner* — Adnan Mirza
(74) *Attorney, Agent, or Firm* — Yudell Isidore Ng Russell PLLC

(57) ABSTRACT

A system, method, and computer program product which allows a user to view and navigate reduced-content web pages on a wireless connection. Upon the user's selection of specific web pages, the pages are then delivered to the user by a less expensive connection, as in a conventional wired internet connection. The delivery is accomplished by several methods, according to different embodiments, including by an electronic mail message, by "push" delivery to an internet-connected data processing system, and by providing a set of hyperlinks to the wired internet connection which reference the selected pages, among other methods. The user is thereby able to view, on a second internet-connected data processing system, the data selected when using the wireless internet-connected data processing system.

16 Claims, 5 Drawing Sheets

U.S. PATENT DOCUMENTS 6,735,186 B1 * 5/2004 Leppinen ...................... 370/338

FOREIGN PATENT DOCUMENTS

| JP | 10-222527 | 8/1998 |
| JP | 11-184777 | 7/1999 |
| WO | WO 99/57657 | 11/1999 |

OTHER PUBLICATIONS

U.S. Appl. No. 09/428,409.

"How the Internet Works" 4th Edition, 1998, Que Corporation.

Rodriguez, Pablo, Biersack, Ernst W.; "Continuous Multicast Push of Web Documents over the Internet"; IEEE Network, Mar./Apr. 1998.

Abdelzaher, Tarek F.; Bhatti, Nina; "Web Content Adaptation to Improve Server Overload Behavior"; Elsevier Science B.V., 1999.

Tang, Wenting, Mutka, Matt W; "Intelligent Browser Initiated Server Pushing" IEEE 2000.

Fielding, R., Gettys, J., Mogul, J.C., Frystyk, H. Masinter, L. Leach, P. Berners-Lee, T. "Hypertext Transfer Protocol—HTTP/1,1"; Network Working Group, Jun. 1999.

\* cited by examiner

SENDING FULL-CONTENT DATA TO A SECOND DATA PROCESSING SYSTEM WHILE VIEWING REDUCED-CONTENT DATA ON A FIRST DATA PROCESSING SYSTEM

BACKGROUND OF THE INVENTION

1. Technical Field

The present invention generally relates to improved networked computer systems and in particular to improved wireless communications over networked computer systems. Still more particularly, the present invention relates to improved communications over a combination of wired and wireless data processing systems.

2. Description of the Related Art

In today's society, the use of the internet and the World Wide Web (WWW or Web) have become pervasive. The Web, a global network of interconnected computer systems which communicate using common protocols and addressing means, allows users to receive information on almost any topic at the press of a button or the click of a mouse, and is becoming the research tool of choice for many users.

Further, the Web is being used more every day as a means to transact business, make purchases, manage investments, and perform other interactive tasks. A user is increasingly able to perform almost any type of personal or business transaction simply by using his client-side data processing system to access a server system to perform the transaction on-line.

Internet use is no longer limited to wired connections such as analog Plain-Old-Telephone-System (POTS) modems, ISDN, and xDSL. Every day, it is becoming more common for users to access the Internet via portable data processing systems that use a wireless connection to the internet. One common example of this is a typical laptop computer systems with a modem that is connected to a wireless telephone. Relatively new examples of this technology are wireless digital telephones and handheld computers with integrated access to the internet over a wireless digital network. These systems use a simplified Web browser which is modified to accommodate the limited display capabilities of the systems.

For example, the PalmPilot® family of PDA systems has Web browsing software like the HandWeb and ProxiWeb. Windows CE and some digital PCS telephones also have Web browsing software.

One significant drawback to using these wireless devices to connect to the internet is that the cost of wireless communication systems are prohibitively high. In some common wireless systems, the cost-per-byte for content delivery is very high relative to wired systems or voice communications. To address this, most wireless devices use some mechanism to reduce the amount of data downloaded from a given website. Common techniques include accessing websites which have content specially designed for wireless devices, with simplified menu options and reduced amounts of text. Another technique is that of "Web clipping," which is essentially the dilution of Web content to essential truncated text. Further, most wireless browsers eliminate any graphics from the website displayed.

The cost differential between wired and wireless internet systems makes these sort of approaches attractive. While wired connections have become relatively inexpensive, even for "dedicated" connections that are continually connected to the internet, wireless systems are still very expensive, and are generally billed either by the length of time the user is connected to the internet, the amount of data transferred, or both. The content-reduction techniques outlined above are used to minimize the cost of the connections.

An unfortunate side effect of these approaches is that the user loses a great deal of the content he was seeking in the first place. While these techniques generally allow the user to perform some basic functions or retrieve some limited information, the user is prevented from seeing the websites in their entirety or from seeing any accompanying graphics or illustrations. Further, the more content he does display on the wireless connection, the more expensive it is.

Often, in order for the user to see the entire web page he was looking for, the user must access the web from a wired data processing system, and look up each page from that connection in order to fully view or print it. Because of the "hyperlinked" nature of the Web, it is often difficult for a user to relocate a particular page on the wired system that he had viewed on the wireless system. It would therefore be desirable to provide a means for a user to easily coordinate the use of a wireless internet connection with the use of a less-expensive wired Internet connection, so that web pages can be viewed less expensively and without unnecessary inefficiency. Even more desirable would be a means for a user to easily coordinate the use of both a relatively expensive and relatively inexpensive connection, whether the distinction be connection speed, connection method, or otherwise, so that the data can be transferred and used less expensively and without unnecessary inefficiency.

SUMMARY OF THE INVENTION

It is therefore one object of the present invention to provide improved networked computer systems.

It is another object of the present invention to provide improved wireless communications over networked computer systems.

It is yet another object of the present invention to provide improved communications over more and less expensive data processing system communication means.

The foregoing objects are achieved as is now described. The preferred embodiment provides a system, method, and computer program product which allows a user to view and navigate reduced-content web pages on a wireless connection. Upon the user's selection of specific web pages, the pages are then delivered to the user by a less expensive connection, as in a conventional wired internet connection. The delivery is accomplished by several methods, according to different embodiments, including by an electronic mail message, by "push" delivery to an internet-connected data processing system, and by providing a set of hyperlinks to the wired internet connection which reference the selected pages, among other methods. The user is thereby able to view at a later time, on a second internet-connected data processing system, the data selected when using the wireless internet-connected data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
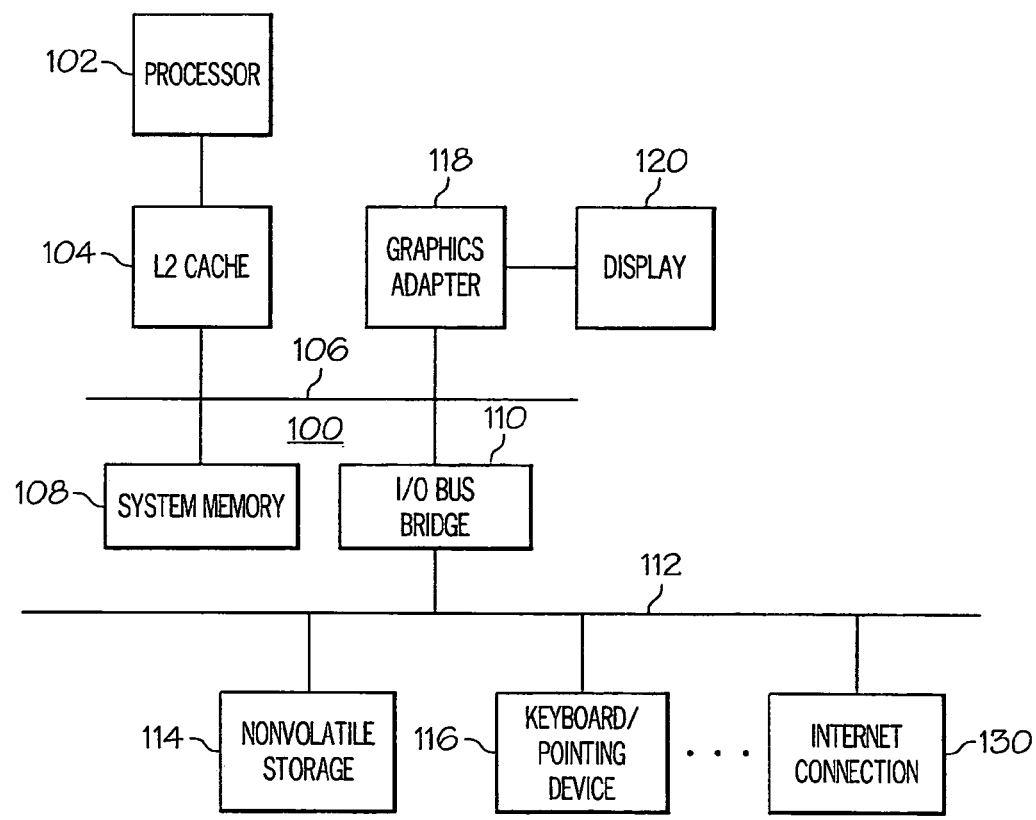
FIG. 1A depicts a data processing system in accordance with a preferred embodiment of the present invention.

With reference now to the figures, and in particular with reference to FIG. 1A, a block diagram of a data processing system in which a preferred embodiment of the present invention may be implemented is depicted. Data processing system 100 includes processor 102 and associated L2 Cache 104, which in the exemplary embodiment is connected in turn to a system bus 106. System memory 108 is connected to system bus 106, and may be read from and written to by processor 102.

Also connected to system bus 106 is I/O bus bridge 110. In the exemplary embodiment, data processing system 100 includes graphics adapter 118 connected to bus 106, receiving user interface information for display 120. Peripheral devices such as nonvolatile storage 114, which may be a hard disk drive, and keyboard/pointing device 116, which may include a conventional mouse, a trackball, or the like, are connected to I/O bus 112.

Also connected to I/O bus 122 is internet connection 130. This connection can be implemented in any number of ways, including an analog modem, a cable modem, xDSL, T1, a wireless device, and others.

The exemplary embodiment shown in FIG. 1A is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 is provided solely as an example for the purposes of explanation and is not intended to imply architectural limitations. A data processing system as described above can function both as a client system and a server system in the embodiments described below, when connected to a computer network such as an intranet or the Internet. Of course, the data processing systems described below, and in particular the client data processing system, may be implemented in a mobile telephone, a handheld system such as a personal digital assistant, or other portable or handheld data processing system, as long as it can perform the claimed functions.

Figure 1B:
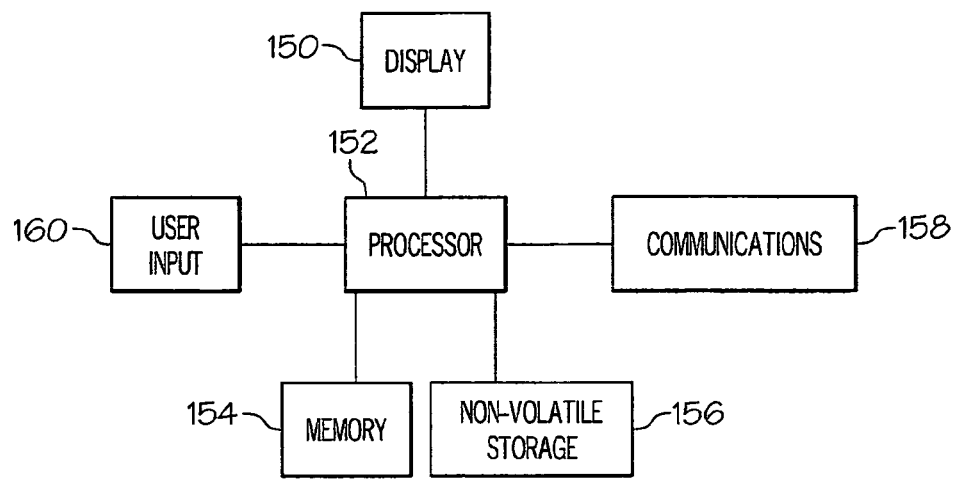
FIG. 1B depicts a mobile computing device in accordance with a preferred embodiment of the present invention.

FIG. 1B shows a block diagram of a mobile computing device in which the preferred embodiment of the invention may be implemented. The mobile communications device comprises a display 150 which is written to by a processor 152. The processor 152 is also able to read from and write to memory 154 and non-volatile storage 156. Communications block 158 is a wireless communications system, and is connected to allow the processor to communicate over a wireless network. User input device 160, which can be a keypad, a touchpad, or other types of input device, is connected to allow the user to interact with the programs being executed by the processor 152.

The mobile communications device shown in FIG. 1B can be a mobile telephone, a PDA device, or a portable data processing system. The block diagram of FIG. 1B does not show other components of the communications device which are not particular to the preferred embodiment. For example, the mobile communications device can be a mobile telephone, but the telephone-specific components, such as a dialing keypad, are not shown. Further, the elements shown in this diagram are not necessarily integral to the device; for example, the wireless communications system may be an external modem connected to a wireless telephone.

The preferred embodiment provides a system and method which allows a user to view and navigate reduced-content web pages on a wireless connection. Upon the user's selection of specific web pages, the pages are then delivered to the user by a less expensive connection, as in a conventional wired internet connection. The delivery is accomplished by several methods, according to different embodiments, including by an electronic mail message, by "push" delivery to an internet-connected data processing system, and by providing a set of hyperlinks to the wired internet connection which reference the selected pages, among other methods. The user is thereby able to view, on a second internet-connected data processing system, the data selected when using the wireless internet-connected data processing system.

Figure 2:
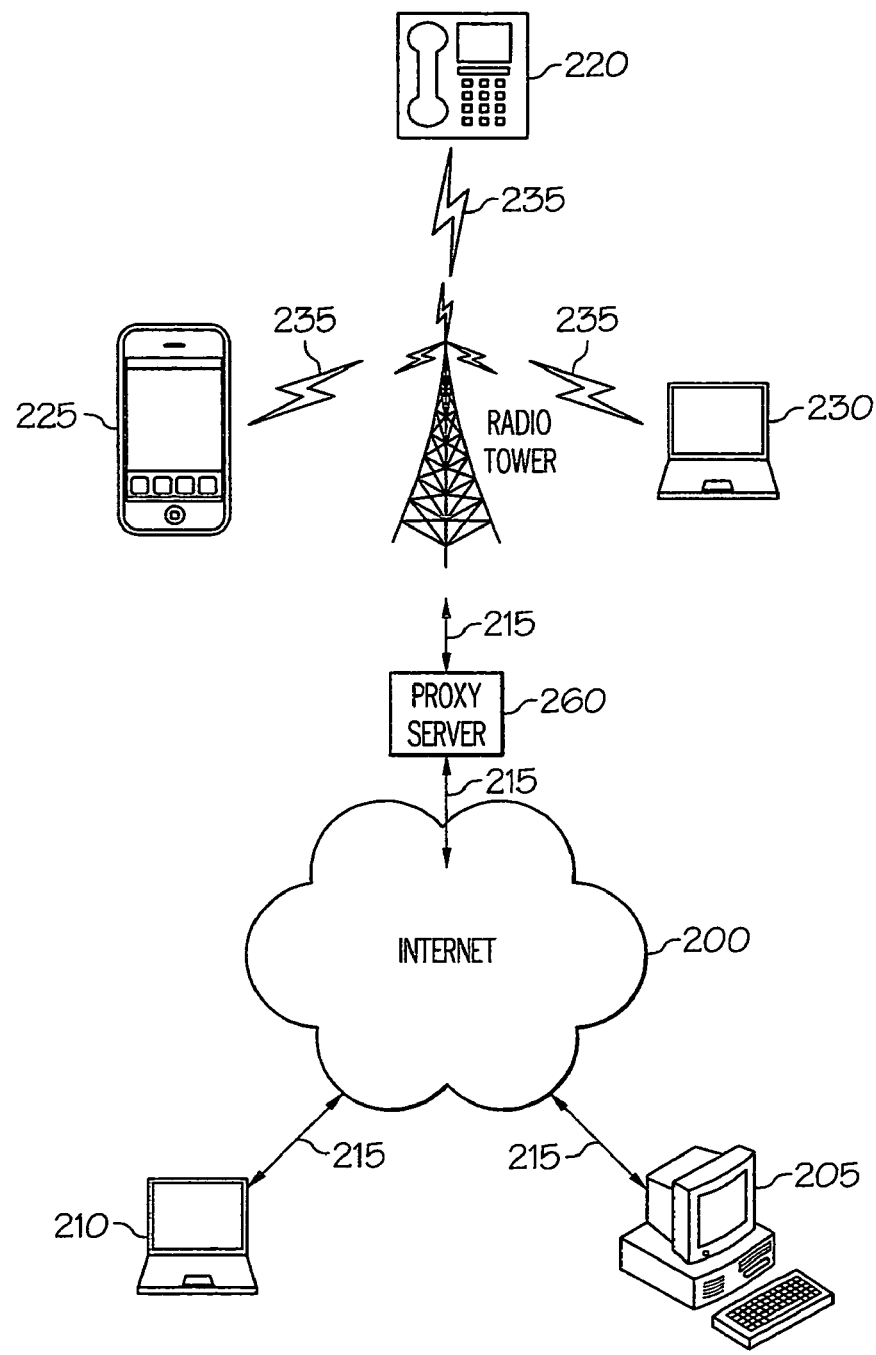
FIG. 2 is block diagram of internet-connected wired and wireless devices, in accordance with a preferred embodiment of the present invention.

FIG. 2 shows a block diagram of the internet 200 and connected devices. The connected devices include data processing systems 205 and 210, which are connected by a wired system 215, which can be a POTS system, xDSL, T1, cable, fiber optic, or other wired system. Proxy server 260 is connected to the internet 200 by a wired connection 215. The proxy server 260 performs the content-management functions as described herein, and is connected between the internet and the wireless devices. Wireless devices include telephone 220, handheld PDA 225, and portable data processing system 230, which are each connected over respective wireless connections 235. Of course, the wireless connections 235 may differ between devices in terms of protocol, speed, and other means, but are shown here in common form for the sake of simplicity. Further, other types of wireless and wired devices which support internet communications can be connected to the systems above, within the scope of the invention.

When content is displayed on a Web client connected over an expensive wireless connection 235, the preferred embodiment provides that proxy server 260 will enable the Web client running on the connected device 220/225/230 to download only truncated information for reading immediately, and have the full content delivered by e-mail or push to a different system. The different system, such as data processing system 205 or 210, is connected to the internet, in the preferred embodiment, by a much less expensive means, for example by a wired system 215. In this way, the full content can be read at a later time, on the less expensive system.

The proxy server 260 receives content data from the internet and intended for the wireless devices, and produces truncated/reduced content versions of this data. According to the preferred embodiment, the content data received is in conventional Hypertext Markup Language (HTML), and the reduced content version is in Wireless Markup Language (WML). WML is a markup language intended for use in specifying content and user interface for narrowband devices, including cellular phones and pagers. Every truncated item delivered to a client 220/225/230 over an expensive connection such as wireless system 235, includes a special mark or other user setting that, when selected by the user, results in offline delivery of the full content (or alternative content) via e-mail or push to a different computer system connected cheaply to the Internet. The user may choose that, by default, every reduced-content page he views is also delivered, in full form, to the other system.

Alternatively, a hyperlink bookmark to each page the user has received in truncated form can be stored, and later downloaded or delivered to the system with the less expensive internet connection, so that the full-content pages can be viewed at leisure on that system.

In this manner, the user is able to act more efficiently and less expensively by reading essential content immediately while reading extensive content later on. Because the user is able to select the content to be delivered to the alternate system, he is not forced to try to manually find the content again at a later time, which can waste a great deal of time.

Figure 3:
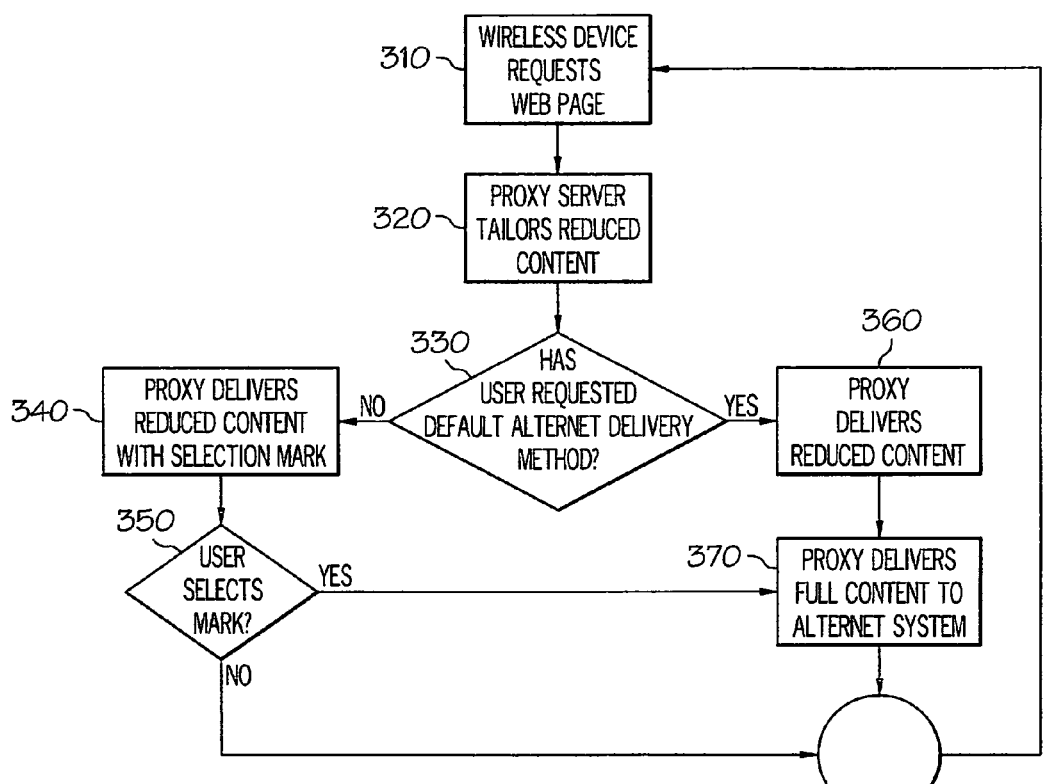
FIG. 3 is flowchart of a process in accordance with a preferred embodiment of the present invention.

FIG. 3 is a flowchart of a process in accordance with the preferred embodiment of the present invention. In this flowchart, it is assumed that the user is accessing the Internet via a wireless devices such as those discussed with reference to FIG. 2. These wireless devices will typically use a proxy server to access web sites. The proxy server has the ability to convert the standard full-content web-pages to the reduced-content web pages described above.

When the user is accessing the internet with the wireless device, or other relatively more expensive connection, the wireless device will request a web page (step 310). The proxy server will then process the web page, and compose a reduced-content version of the page (step 320). Next, the proxy server determines if the user has set the system to send, automatically or by default, a full-content version of the web pages to a wired or less-expensive connection (step 330).

If the user has not selected automatic or default alternate delivery, the proxy server will deliver the reduced content page, together with a selection mark, to the wireless device (step 340). Of course, the selection mark can be added to the content of the reduced content page, or a flag can be sent with the page which indicates that the wireless device should give the user a selection option when the page is displayed.

When the page is displayed, the user can select the selection mark, or otherwise select the page, depending on how the option is displayed to the user. If the user selects the page by selecting the selection mark or otherwise (step 350), the server will deliver the full-content version of the page to the user's alternate system (step 370). The delivery may be by email, push delivery, or the pages, or links to the pages, may be stored on a server. The user may then navigate to the next page (step 310).

If the user has selected automatic or default alternate delivery (step 330), the system will then deliver the reduced content page to the wireless device (step 360). No selector mark is included. The server will then deliver the full-content version of the page to the user's alternate system (step 370). The user may then navigate to the next page (step 310).

The user can then, at a later time, read the full content of the selected pages on the system with the less-expensive connection. While the delivery to the alternate system may be substantially simultaneous with the selection of the page on the more-expensive connection, the user will not typically view these pages until a later time; it is assumed that the user does not have immediate access to the less-expensive alternative. Thus, while step 370, above, may occur at a later time, the user can continue to navigate on his wireless device (at step 310).

Figure 4A:
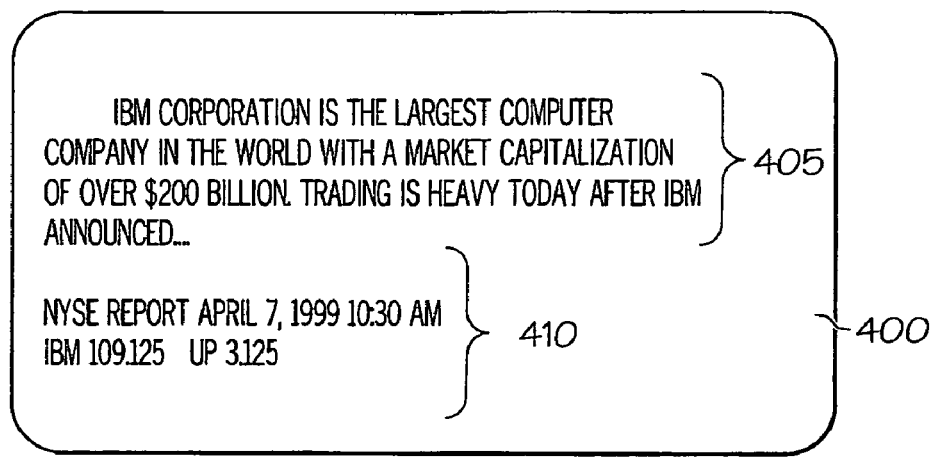
FIGS. 4A and 4B show exemplary full-content and reduced-content displays, respectively, in accordance with a preferred embodiment of the present invention.
Figure 4B:
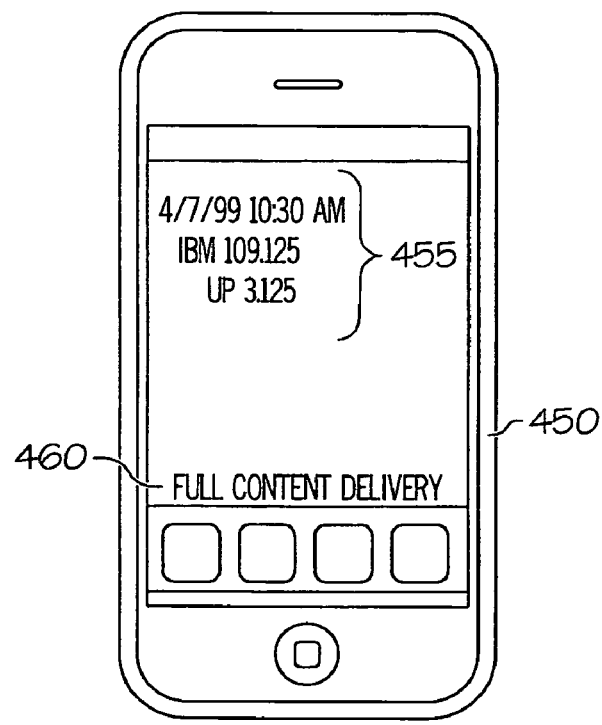

FIGS. 4A and 4B show exemplary full-content and reduced-content displays, respectively, in accordance with a preferred embodiment of the present invention. FIG. 4A shows a sample display 400, as might be shown on a typical data processing system. In this example, the user has requested information about the stock performance of IBM Corporation. The full content page shows both introductory text 405 and current stock-ticker information 410. While the user might appreciate the introductory information on a system that is cheaply connected to the internet, as described above, he will often prefer to only receive the essential data when connected over a wireless or other expensive connection.

FIG. 4B shows a sample reduced-content page, corresponding to that of FIG. 4A, and as described above. Here, a handheld PDA system 450 is shown, along displaying a reduced content page concerning the stock performance of IBM Corporation. On the reduced content display, only the essential stock-ticker information 455 is shown, which is much less expensive to receive over a wireless connection. Note also the selection mark 460. If the user selects the mark 460, as by tapping on it with a stylus or by other conventional means, the full-content page (as shown in FIG. 4A) is delivered to the users alternate system, as described above.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for delivering data over a network system, comprising the steps of:
receiving, in a first data processing system, a request for a first data page from a second data processing system;
in response to the request from the second data processing system, sending a reduced-content page, corresponding to the first data page, from the first data processing system to the second data processing system, wherein said reduced-content page contains less than the full content of the first data page; and
selectively sending a selection mark to the second data processing system;
in further response to the request from the second data processing system and if a request corresponding to the selection mark is received, sending the first data page from the first data processing system to a third data processing system having a common user association with the second data processing system,
wherein the second data processing system communicates with the first data processing system over a first connection and the third data processing system communicates with the first data processing system over a second connection.

2. The method of claim 1, further comprising, after the receiving step, creating the reduced-content page corresponding to the first data page.

3. The method of claim 1, wherein the network system is the internet.

4. The method of claim 1, wherein the first connection is a wireless connection and the second connection is a non-wireless connection.

5. The method of claim 1, wherein the first data page comprises a markup language file.

6. The method of claim 1, wherein the reduced-content page comprises a markup language file containing less than the full content of the first data page markup language file.

7. The method of claim 1, wherein the first data page is sent to the third data processing system via an electronic mail message.

8. The method of claim 1, wherein the first data page is sent to the third data processing system via a push delivery system.

9. A non-transient computer-readable medium having stored thereon computer-executable instructions for delivering data over a network system, said computer-executable instructions adapted for performing a method comprising:

receiving, in a first data processing system, a request for a first data page from a second data processing system;

in response to the request from the second data processing system, sending a reduced-content page from the first data processing system to the second data processing system, wherein said reduced-content page contains less than the full content of the first data page;

selectively sending a selection mark to the second data processing system;

in further response to the request from the second data processing system, sending the first data page from the first data processing system to a third data processing system having a common user association with the second data processing system a request corresponding to the selection mark is received, wherein the second data processing system communicates with the first data processing system over a first connection and the third data processing system communicates with the first data processing system over a second connection.

10. The computer-readable medium of claim 9, said method further comprising creating the reduced-content page corresponding to the first data page.

11. The computer-readable medium of claim 9, wherein the network system is the internet.

12. The computer program product of claim 9, wherein the first connection is a wireless connection and the second connection is a non-wireless connection.

13. The computer-readable medium of claim 9, wherein the first data page is a markup language file.

14. The computer-readable medium of claim 9, wherein the reduced content page is a wireless markup language file.

15. The computer-readable medium of claim 9, wherein the first data page is sent to the third data processing system via an electronic mail message.

16. The computer-readable medium of claim 9, wherein the first data page is sent to the third data processing system via a push delivery system.

* * * * *